United States Patent
Sharp et al.

(10) Patent No.: US 9,416,685 B2
(45) Date of Patent: Aug. 16, 2016

(54) AUXILLARY STEAM GENERATION ARRANGEMENT FOR A COMBINED CYCLE POWER PLANT

(71) Applicant: Siemens Energy, Inc., Orlando, FL (US)

(72) Inventors: James H. Sharp, Orlando, FL (US); Michael Scheurlen, Orlando, FL (US); Monica B. Hansel, Melbourne, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 433 days.

(21) Appl. No.: 14/148,065

(22) Filed: Jan. 6, 2014

(65) Prior Publication Data
US 2015/0192039 A1   Jul. 9, 2015

(51) Int. Cl.
*F02C 6/00* (2006.01)
*F01K 23/10* (2006.01)
*F22B 1/18* (2006.01)
*F22B 37/00* (2006.01)

(52) U.S. Cl.
CPC ............... *F01K 23/10* (2013.01); *F01K 23/106* (2013.01); *F22B 1/1815* (2013.01); *F22B 1/1861* (2013.01); *F22B 37/008* (2013.01); Y02E 20/16 (2013.01)

(58) Field of Classification Search
CPC ....... F01K 23/10; F01K 23/101; F01K 13/02; F02C 7/22; F02C 7/18; F02C 6/00; F02C 6/18
USPC .................... 60/39.182, 39.15, 772
See application file for complete search history.

(56) References Cited

U.S. PATENT DOCUMENTS

| | | | | |
|---|---|---|---|---|
| 4,136,643 | A * | 1/1979 | Aguet .................. | F22B 1/1861 122/240.1 |
| 4,882,903 | A * | 11/1989 | Lowry, Jr. et al. ...... | F01K 3/247 110/212 |
| 6,145,295 | A | 11/2000 | Donovan et al. | |
| 6,957,540 | B1 * | 10/2005 | Briesch ................ | F01K 23/106 60/39.181 |
| 2002/0116930 | A1 * | 8/2002 | Anderson .............. | F01K 23/10 60/772 |
| 2015/0143793 | A1 * | 5/2015 | Feller .................... | F01K 23/106 60/39.182 |
| 2015/0192036 | A1 * | 7/2015 | Sharp .................... | F01K 23/10 60/39.182 |
| 2015/0233296 | A1 * | 8/2015 | Kraft ..................... | F02C 9/50 60/776 |

* cited by examiner

*Primary Examiner* — Jacob K Ackun

(57) ABSTRACT

A combined cycle plant (10) including: a gas turbine engine (12) having a compressor (14), a combustor and a gas turbine (16); a heat recovery steam generator (20) (HRSG) configured to receive exhaust from the gas turbine engine; a steam turbine (22, 24) configured to receive steam from the HRSG; a supplemental air arrangement (40) configured to generate supplemental heated air (42) when operating and to operate independent of the gas turbine engine; and a kettle boiler (26, 28) configured to use heat from the supplemental heated air to generate steam used in the steam turbine.

20 Claims, 7 Drawing Sheets

AUXILLARY STEAM GENERATION ARRANGEMENT FOR A COMBINED CYCLE POWER PLANT

FIELD OF THE INVENTION

The invention relates to an arrangement for generating auxiliary steam to be used in a combined cycle power plant. In particular, the arrangement incorporates a kettle boiler and a supplemental source of heated air to generate the auxiliary steam.

BACKGROUND OF THE INVENTION

During operation of a combined cycle plant a gas turbine engine produces all the heat necessary to generate all the steam that is required to run the plant. This includes steam required to operate the steam turbine as well as the steam required to supply the plant's peripheral processes When the gas turbine engine is not operating some of the peripheral plant processes still require steam Conventionally this steam has been generated by an auxiliary steam generation system that is a miniature, self-contained boiler system that may include a gas or oil fired burner, a water feed pump, chemical treatment equipment etc. This auxiliary steam may be used for any or all of the steam turbine gland seals, low pressure sparging of condenser hotwell, pegging of the deaerator tank (DA tank), or other purposes. When the gas turbine engine is operating and providing all of the steam necessary for operation of the combined cycle plant the auxiliary steam generation system may be shut down. An auxiliary steam generation system may cost upwards of two million dollars yet it may sit idle for most of its lifetime During operation of the gas turbine engine air is compressed in the gas turbine engine's compressor in a process that generates a significant amount of heat. One configuration of a combined cycle plant makes use of this heat by routing the heated air through a kettle boiler, also known as a rotor air cooler, as described in U.S. Pat. No. 6,145,295 to Donovan et al and incorporated by reference herein in its entirety. Kettle boilers conventionally have two primary functions. The first is to provide a supply of cool air that is used to cool components in the gas turbine engine while the engine is in operation. The second is to provide an additional supply of steam to the Heat Recovery Steam Generator (HRSG), which is part of the combined cycle plant configured to receive exhaust from the gas turbine engine and use heat in the exhaust to generate steam for the steam turbine.

The kettle boiler itself has both an air side and a water side. Heated air from the compressor is delivered to the air side and cooled by heat exchange with water on the water side of the kettle boiler The kettle boiler cooled air is then used to cool hot parts in the gas turbine engine. The water heated in the kettle boiler may come from the low pressure (LP) and/or intermediate pressure (IP) sections of the HRSG The additional heat added to the water in the kettle boiler increases the volume of steam generated and thus increases the overall efficiency of the plant

BRIEF DESCRIPTION OF THE DRAWINGS

The invention is explained in the following description in view of the drawings that show.

DETAILED DESCRIPTION OF THE INVENTION

Figure 1:
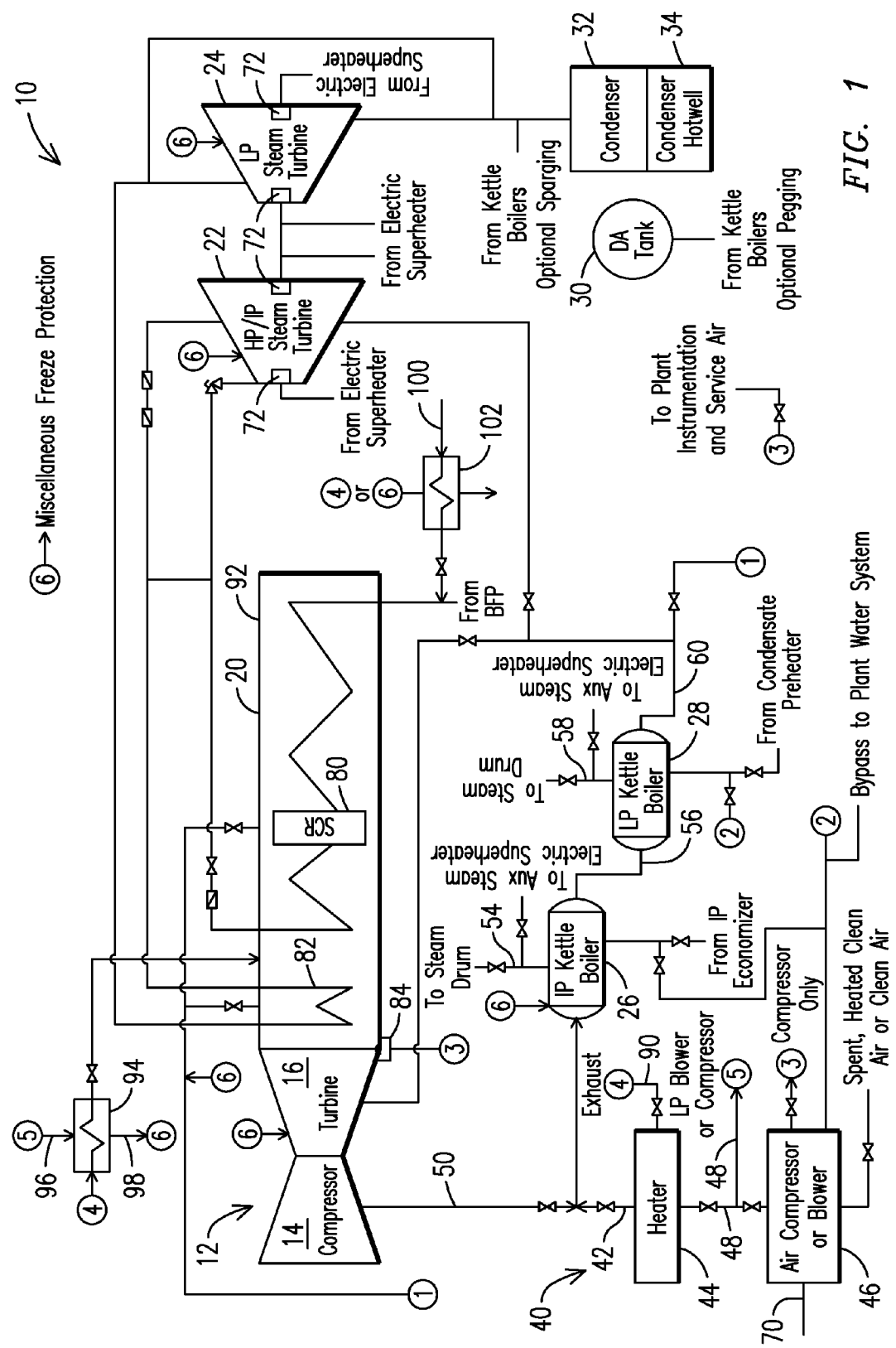
FIG. 1 is a schematic representation showing an exemplary embodiment of a combined cycle plant incorporating the supplemental air arrangement in a manner that permits a variety of uses.

The present inventors have conceived of a unique configuration for a combined cycle plant that applies components already used in certain combined cycle plant configurations and adds some relatively less expensive components to create an arrangement that generates auxiliary steam whether or not the gas turbine engine is operating This eliminates the need for the relatively expensive miniature, self-contained auxiliary steam generation system currently being used to generate auxiliary steam. The result is a decrease in the amount of capital investment necessary to create a combined cycle plant as well as a decrease in the maintenance costs associated with the self contained systems. Additionally, this system offers a significant increase in flexibility of plant operations in comparison to the current systems.

Specifically, the inventors proposed to provide a supplemental air arrangement that supplies supplemental heated air to the kettle boiler. The supplemental heated air, which may or may not also be compressed, is used to heat water also supplied to the kettle boiler to generate steam. When the gas turbine engine is not operating the steam may be used as auxiliary steam When the gas turbine engine is operating the steam may be used to supplement steam production and optionally to eliminate the need to bleed cooling air from the compressor section of the gas turbine. After passing through the kettle boiler the kettle boiler cooled air may be used to heat (preheat) the gas turbine engine's turbine, the steam turbine, the selective catalytic reduction (SCR) catalyst, and/or the HRSG superheater. While this air has been cooled in a kettle boiler, it is still warm enough to serve the heat/preheat functions described herein.

The ability to keep the gas turbine, the steam turbine, or both warm during periods of shutdown or to preheat the turbines after long shutdowns allows for faster startup times and less thermal wear and tear on the turbines from the heating and cooling cycles. Preheating the SCR catalyst may help reduce unwanted emissions prior to startup Preheating the HRSG and other components of the combined cycle plant may offer freeze protection for the HRSG and the other components and may also enable faster startup. Alternately the kettle boiler cooled air or a mix of air from the kettle boiler exit and air from the compressor, if used, may be used to control clearance of blade tips in the gas turbine engine, such as in the turbine section.

Various other embodiments can take advantage of the proposed arrangement. For example, if a compressor is included as part of the supplemental air arrangement, some of the compressed air may be used for plant operations, such as instrumentation etc If an interstage cooled compressor is used water for the kettle boiler may be preheated by the cooling section of the interstage cooled compressor. If the heater used in the supplemental air arrangement produces an exhaust stream then the exhaust stream may be used to heat (preheat) the HRSG.

FIG. 1 is a schematic representation showing an exemplary embodiment of a combined cycle plant 10 having a gas turbine engine 12 with a compressor 14, a combustor (not shown but well understood in the art), and a gas turbine 16. Also shown are a heat recovery steam generator (HRSG) 20, a combination high pressure (HP)/intermediate pressure (IP) steam turbine 22, a low pressure (LP) steam turbine 24, an IP kettle boiler 26, a LP kettle boiler 28, a deaerator (DA) tank 30, and a condenser 32 having a condenser hotwell 34. While two kettle boilers 26, 28 are shown, one could be used Only a portion of the HRSG 20 is shown Further, a typical HRSG's superheater, evaporator, and economizer arrangement may vary from the configuration shown. A supplemental air arrangement 40 is configured to generate supplemental heated air 42 that is optionally also compressed Other than the supplemental air arrangement 40 and associated piping, the components shown in FIG. 1 may be present in existing combined cycle plants.

The heat for the supplemental heated air 42 may be generated by a supplemental heater 44 such as a gas fired heater, an oil fired heater, or an electric resistance heater Units that would perform satisfactorily in this role are commercially available. When a fuel fired heater is used a supply of inlet air may be drawn across an internal heat exchanger within the fuel fired heater and exit as exhaust The supplemental air 48 would be heated in the heater's internal heat exchanger and exit the supplemental heater 44 as supplemental heated air 42.

The air may be moved by a supplemental air provider 46 such as a blower or a compressor that would provide clean, oil-free supplemental air 48 to the supplemental heater 44 for heating Units that would perform satisfactorily in this role are also commercially available When a blower is used the supplemental air 48 would remain at a relatively low pressure. When a compressor is used the supplemental air 48 can be pressurized as desired. An example of a well suited compressor is an interstage cooled air compressor. An advantage of using a compressor is that it would allow the proposed arrangement to be incorporated into several other important features of the combined cycle plant, including the instrumentation air and the engine turbine blade control arrangement etc. Consequently, one or more than one compressor may be used as necessary to provide the necessary volume of compressed air The compressor, blower, or electric resistance heater may be powered by back feeding power from the power grid when the gas turbine engine is not operating. The indirect fired heater may be fed using an existing supply of fuel During conventional operation of the combined cycle plant 10 the compressor 14 generates engine heated and compressed air 50 that is directed to the IP kettle boiler 26 where heat is transferred to IP working fluid 54 (such as water) coming from, for example, an IP economizer (not shown) The IP working fluid 54 exits the IP kettle boiler 26 and is directed to a steam drum (not shown) where IP steam is generated IP cooled air 56 exiting the IP kettle boiler 26 may be directed to the LP kettle boiler 28 where more heat is transferred to an LP working fluid 58 coming from, for example, the condensate preheater (not shown). LP cooled air 60 exiting the LP kettle boiler 28 is conventionally then directed into the engine's turbine 16 and used to cool components of the engine's turbine 16. Consequently, during conventional operation, when the gas turbine engine 12 is not operating, the kettle boilers 26, 28 sit idle In contrast, the combined cycle plant 10 with the supplemental air arrangement 40 is capable of generating supplemental heated air 42 whether or not the gas turbine engine 12 is operating. While the kettle boilers 26, 28 are shown connected serially with respect to the flow of air, they can alternately be plumbed in any manner deemed suitable. For example, the IP cooled air 56 exiting the IP kettle boiler 26 may, instead of being directed into the LP kettle boiler 28, be directed elsewhere in the combined cycle plant 10

In operation, the supplemental air arrangement 40 generates supplemental heated air 42 that, similar to the engine heated and compressed air 50, is directed to the IP kettle boiler 26 where heat is transferred to IP working fluid 54 (such as water) Thus, when the gas turbine engine 12 is operating, air supplied to the IP kettle boiler 26 may be generated by either or both of the engine turbine 16 and the supplemental air arrangement 40. When the gas turbine engine 12 is not operating air supplied to the IP kettle boiler 26 can be supplied by the supplemental air arrangement 40. Since this configuration is therefore capable of generating steam whether or not the gas turbine engine 12 is operating, the miniature, self-contained boiler system known as the auxiliary steam generation plant of the prior art can be dispensed with.

Using the innovative arrangement, when the gas turbine engine is not operating and the supplemental air arrangement 40 is generating supplemental heated air 42, feedwater 70 can still be heated to the point where steam is generated If the supplemental air provider 46 is an interstage cooled compressor the feedwater 70 can be preheated by being used to cool the interstage cooled compressor. The feedwater 70 can be directed to the IP kettle boiler 26 and be heated to produce the IP working fluid 54. Likewise, the feedwater 70 can be directed to the LP kettle boiler 28 and be heated to produce the LP working fluid 58. The IP working fluid 54 and the LP working fluid 58 can be directed toward an auxiliary steam electric superheater (not pictured) to create auxiliary steam previously created by the auxiliary steam generation plant of the prior art If the gas turbine engine 12 is operating the water may be supplied in the conventional manner by the IP economizer (not shown) and the condensate preheater (not shown) in the LP section In this case the feedwater 70 may simply be directed to the plant water system.

The auxiliary steam electric superheater will raise the temperature and quality of the auxiliary steam. Upon leaving the superheater the steam can be used in normal fashion to provide steam for a gland seal 72 in either or both of the steam turbines 22, 24. Additionally or alternately, some or all of the steam from the IP kettle boiler 26 and the LP kettle boiler 28 may be used to provide pegging for the deaerator tank 30 or to provide sparging for the condenser hotwell 34. Alternately, the steam from the kettle boilers 26,28 or the electric superheater may be used for any other desired purpose.

In addition to supplementing steam generation when the gas turbine engine 12 is operating and generating auxiliary steam when the gas turbine engine 12 is not operating, the LP cooled air 60 exiting the LP kettle boiler 28 can be used throughout the combined cycle plant 10 in a variety of ways to heat because it may still contain a significant amount of usable heat energy, and in a variety of ways to cool since it is still at a lower temperature than some components of the combined cycle plant 10.

Figure 2:
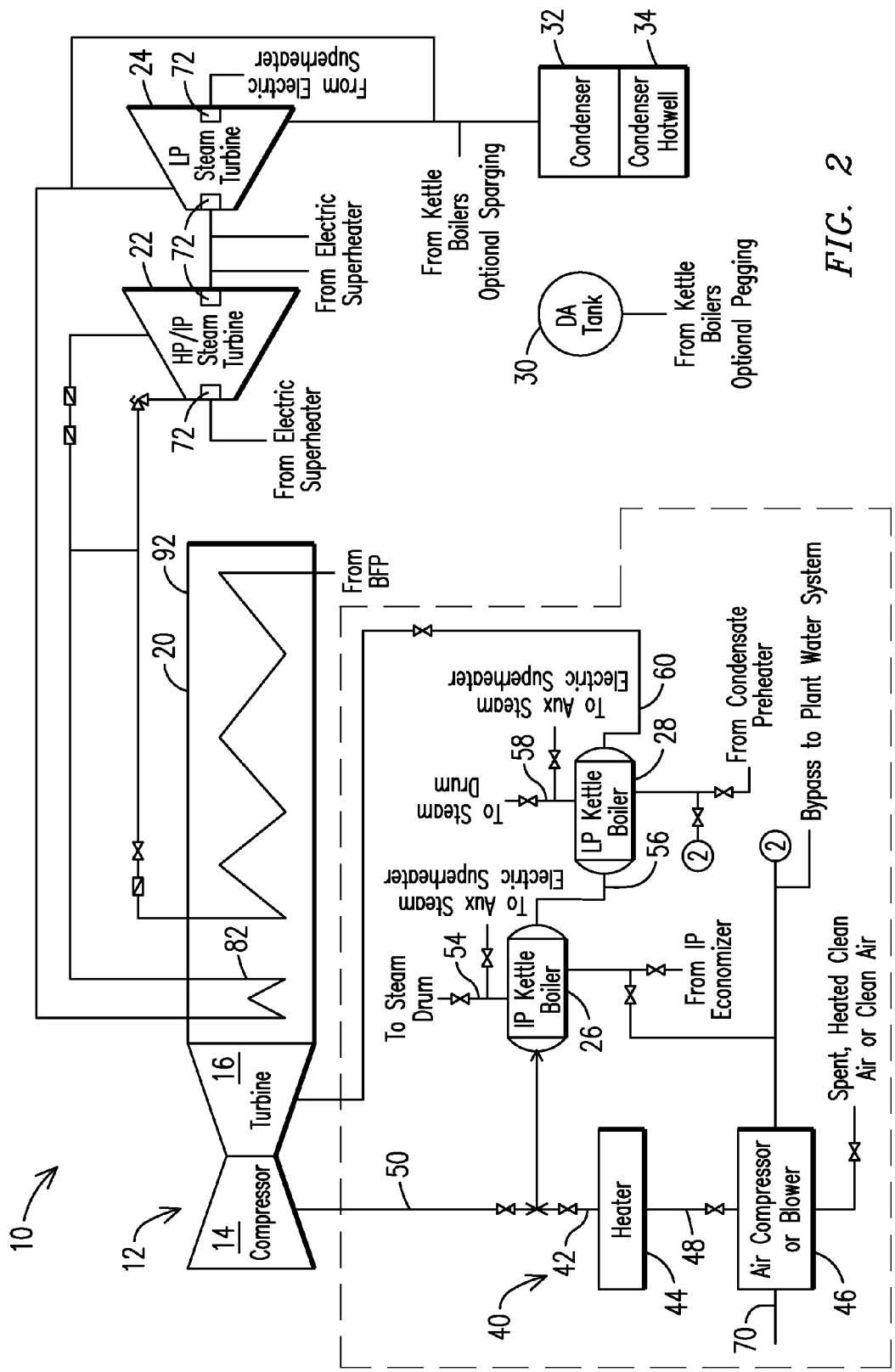
FIG. 2 is a schematic representation showing an exemplary embodiment of a combined cycle plant incorporating the supplemental air arrangement to generate auxiliary steam and to generate heated air that can be used to heat a turbine of the gas turbine engine.

FIG. 2 is a schematic representation showing an exemplary embodiment of a combined cycle plant 10 incorporating the supplemental air arrangement 40 in a basic manner that can be used to generate auxiliary steam and to generate heated air that can be used to cool, heat, and/or preheat portions of the gas turbine engine. In this exemplary embodiment the portion is the turbine 16. The LP cooled air 60 exiting the LP kettle boiler 28 may be directed to the engine turbine 16 and used to cool a rotor shaft and/or other components of the engine turbine 16. The LP cooled air 60 could also be used to heat and/or preheat the engine turbine 16 prior to startup which would allow for faster startup. In an exemplary embodiment, the steps to this process include: activating the supplemental air arrangement 40 and delivering warm air at a temperature of approximately 260-600 degrees Celsius (500-1100 degrees F.) to the gas turbine; allowing exhaust from the supplemental heater 44 to flow through the HRSG 20; and supplying auxiliary steam to the gland seal(s) 72 in the steam turbine(s) 22, 24.

Figure 3:
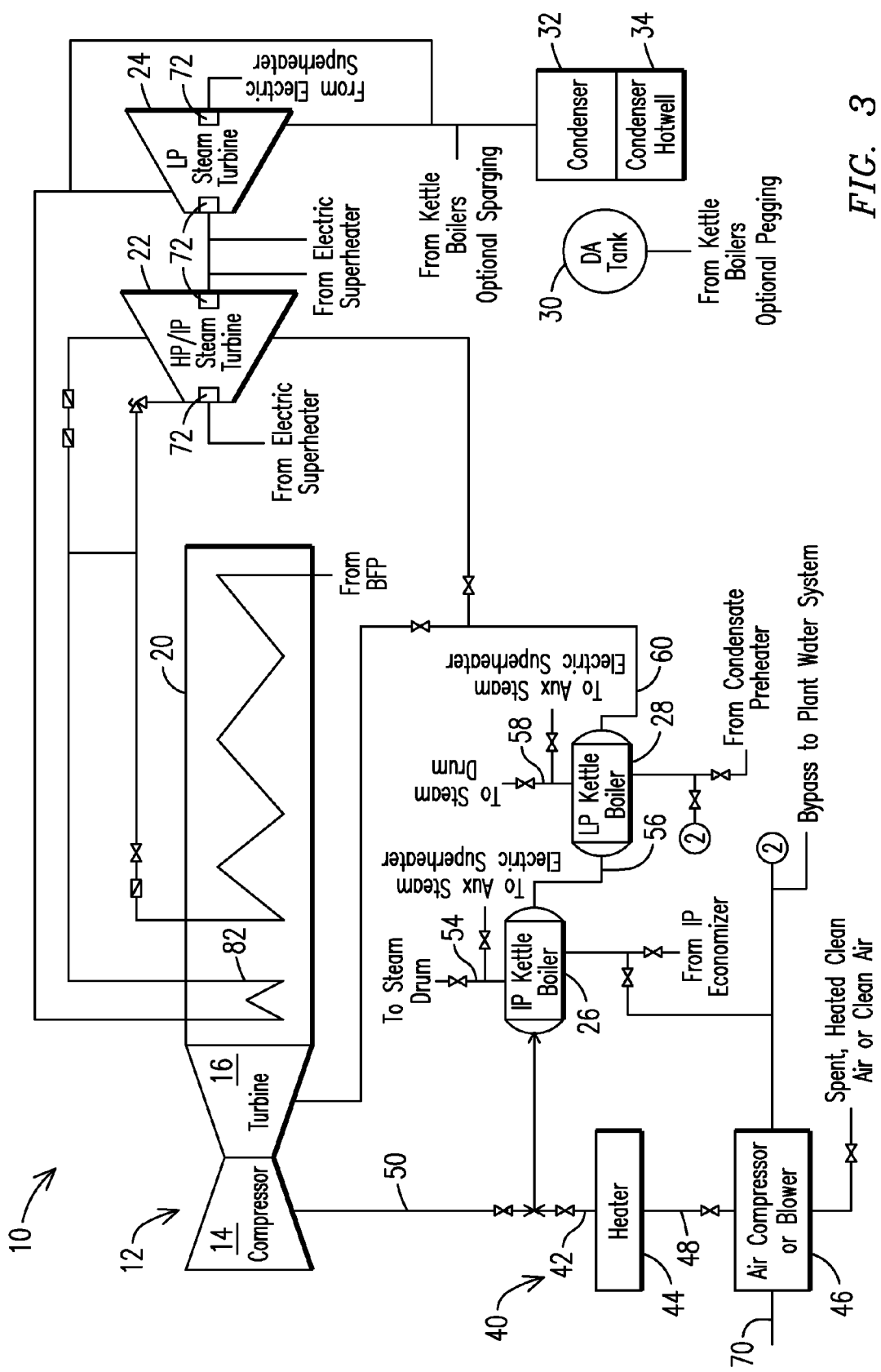
FIG. 3 is a schematic representation showing an exemplary embodiment of a combined cycle plant of FIG. 2 incorporating the supplemental air arrangement to heat a steam turbine.

FIG. 3 is a schematic representation showing an exemplary embodiment of a combined cycle plant 10 of FIG. 2 in a manner that further permits use of heated air to heat and/or preheat a steam turbine The LP (relatively) cooled air 60 can be directed to the steam turbine(s) 22, 24 to keep the steam turbine(s) 22, 24 warm during short shutdowns, and/or to preheat the steam turbine(s) 22, 24 after longer shutdowns. While this air has been cooled in a kettle boiler, it is still warm enough to serve the heat/preheat functions described herein In an exemplary embodiment, the steps to this process include: activating the supplemental air arrangement 40 and delivering warm air at a temperature of approximately 260-600 degrees Celsius (500-1100 degrees F.) to the kettle boiler(s) to generate auxiliary steam; delivering auxiliary steam to the turbine gland seal(s) 72; sending the kettle boiler cooled air 60 to the steam turbine(s) 22, 24, and allowing exhaust from the supplemental heater 44 to flow through the HRSG 20 The warming/preheating of the engine's turbine 16 can be implemented independent of or in conjunction with the warming/preheating of the steam turbine(s) 22, 24.

Figure 4:
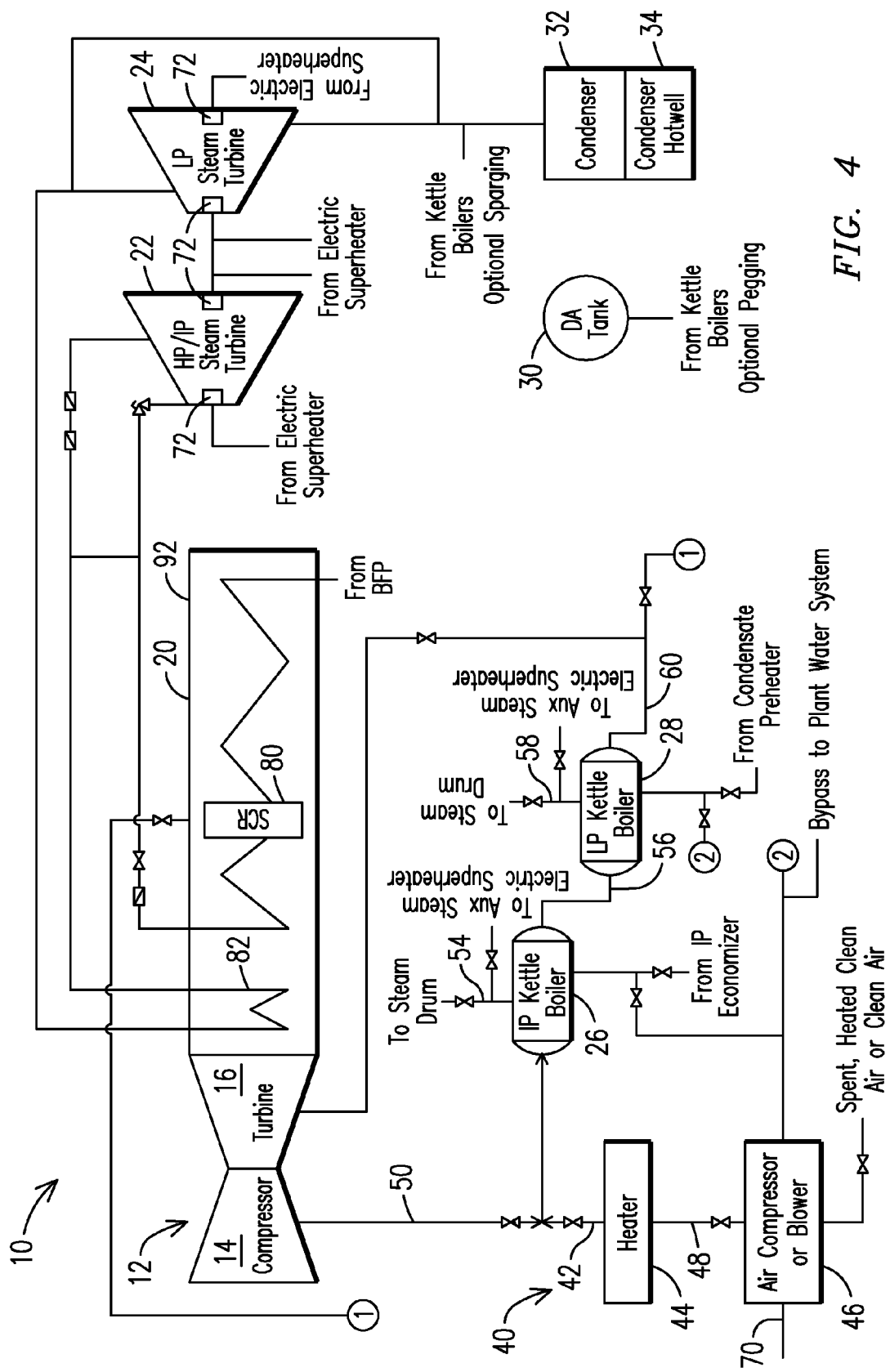
FIG. 4 is a schematic representation showing an exemplary embodiment of a combined cycle plant of FIG. 2 incorporating the supplemental air arrangement to heat a selective catalytic reduction (SCR) catalyst and a cooler section of a heat recovery steam generator (HRSG).

FIG. 4 is a schematic representation showing an exemplary embodiment of a combined cycle plant 10 of FIG. 2 in a manner that permits use of the LP cooled air 60 exiting the LP kettle boiler 28 to heat a selective catalytic reduction (SCR) catalyst 80 and the HRSG 20, and optionally, a cooler section of the HRSG 20 Preheating the SCR could lead to slightly lower emissions on startup of the gas turbine engine 12, which is desirable.

Figure 5:
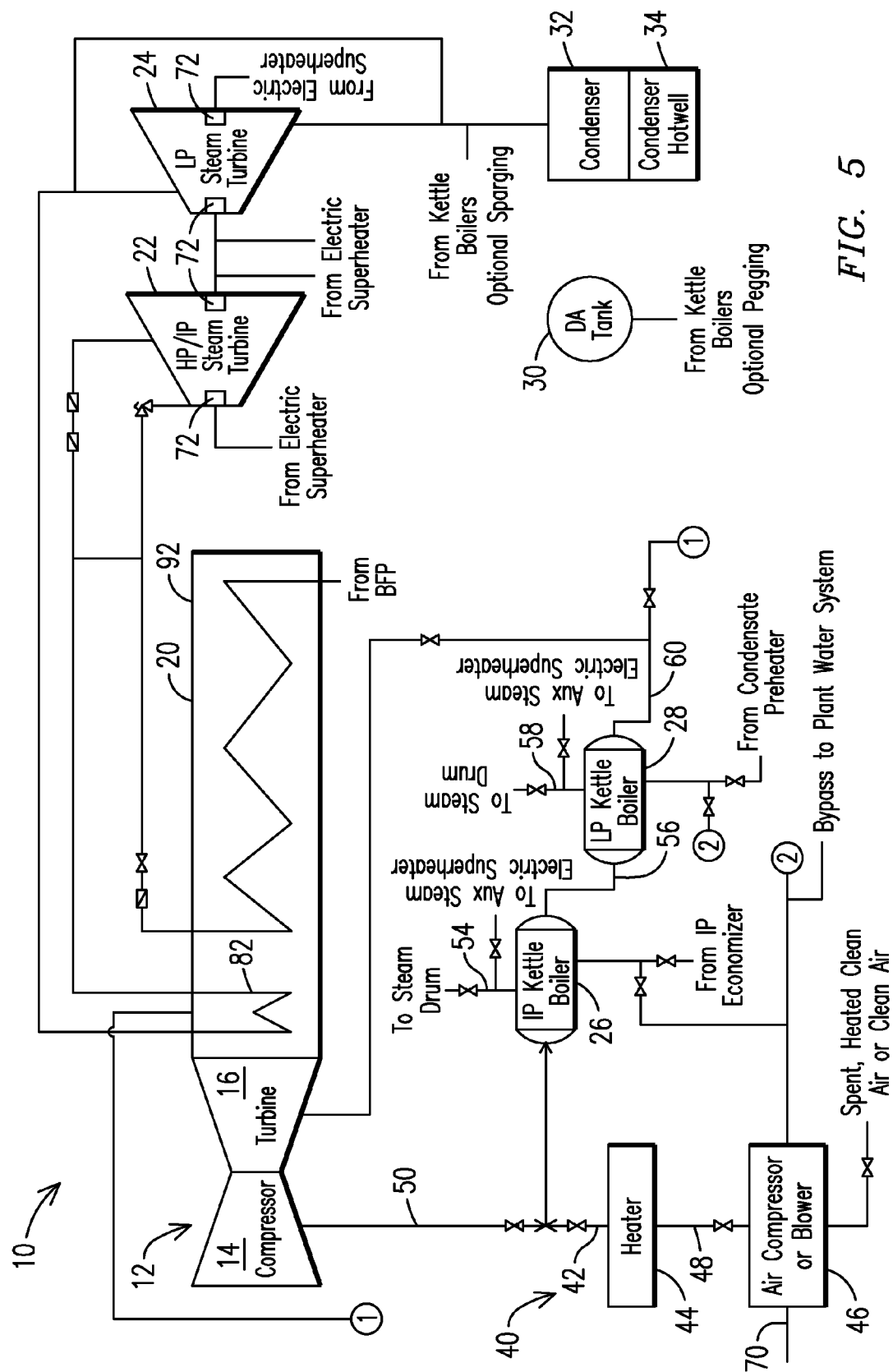
FIG. 5 is a schematic representation showing an exemplary embodiment of a combined cycle plant of FIG. 2 incorporating the supplemental air arrangement to heat a superheater of a heat recovery steam generator.

FIG. 5 is a schematic representation showing an exemplary embodiment of a combined cycle plant of FIG. 2 in a manner that permits use of compressed air to heat a superheater 82 of the HRSG 20.

Figure 6:
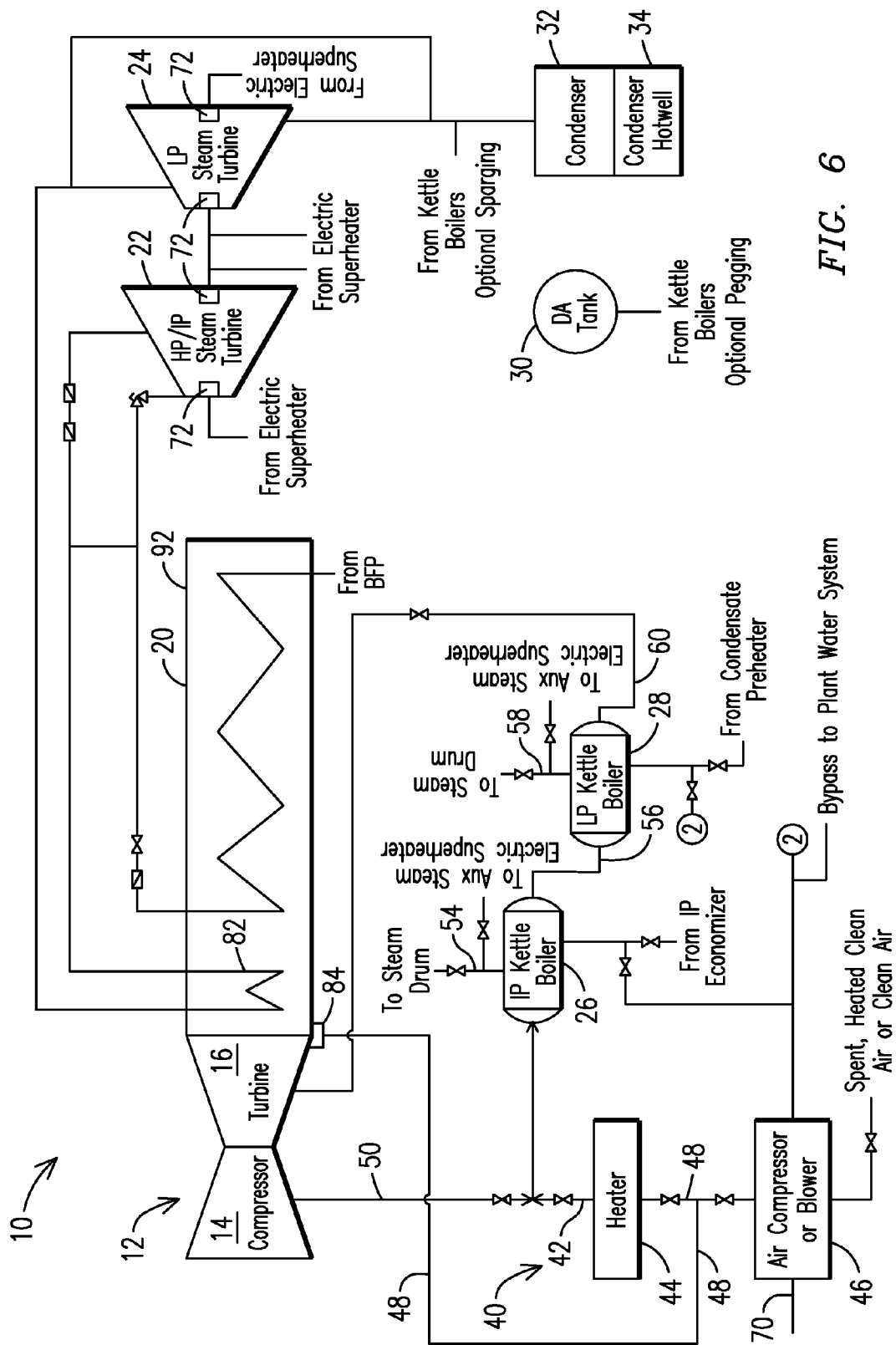
FIG. 6 is a schematic representation showing an exemplary embodiment of a combined cycle plant of FIG. 2 incorporating the supplemental air arrangement to control blade tip clearance in the gas turbine engine.

FIG. 6 is a schematic representation showing an exemplary embodiment of a combined cycle plant 10 of FIG. 2 in a manner that permits the use of supplemental air 48 to control blade tip clearance in the gas turbine via a blade tip clearance control arrangement 84. This allows for a simplification of the compressed air system used in the combined cycle along with the benefits described herein of providing auxiliary steam for the combined cycle plant without the use of an additional auxiliary boiler.

Figure 7:
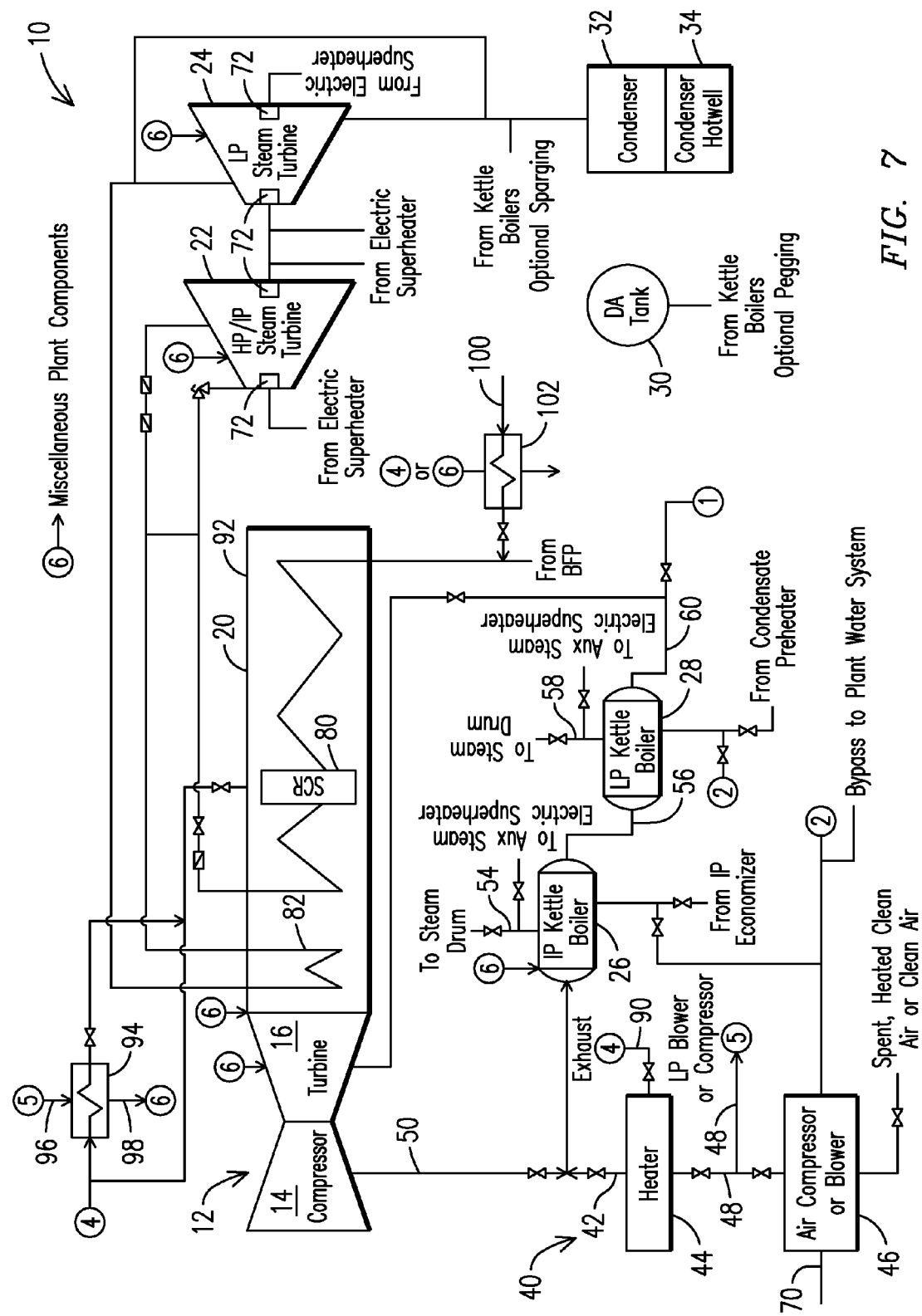
FIG. 7 is a schematic representation showing an exemplary embodiment of a combined cycle plant of FIG. 2 incorporating the supplemental air arrangement to heat various components of the combined cycle plant.

FIG. 7 is a schematic representation showing an exemplary embodiment of a combined cycle plant 10 of FIG. 2 in a manner that permits use of supplemental heater exhaust 90 from a supplemental heater 44 to heat various components of the combined cycle plant 10 For exemplary embodiments when the supplemental heater 44 generates exhaust, such as a fuel fired heater, the supplemental heater exhaust 90 may still contain usable heat even after heating the supplemental air 48 The supplemental heater exhaust 90 may then be directed into the HRSG 20 to heat the HRSG 20 generally, or any specific component of the HRSG 20, such as the superheater 82, the SCR catalyst 80, and the cooler end 92 of the HRSG 20. This is advantageous because the HRSG 20 is already configured to receive "dirty" exhaust from the gas turbine engine 12, and thus can readily accept dirty supplemental heater exhaust 90 from the supplemental heater 44.

Alternately, or in addition, the supplemental heater exhaust 90 can be directed to a first air heater exhaust heat exchanger 94 where clean air 96 can be heated by the supplemental heater exhaust 90. The heated clean air 98 could then be used to preheat the HRSG 20 and the other HRSG components (SCR catalyst 80, superheater 82 etc) in the same manner as the supplemental heater exhaust 90 However, since some components require clean air as opposed to exhaust, the heated clean air 98 could be used in multiple additional locations. For example, the heated clean air 98 could be used to heat/preheat components of the gas turbine engine 12 such as a rotor (not shown) etc It could be used to heat/preheat components of the steam turbine(s) 22, 24, such as the steam turbine rotor shaft (not shown) etc. It could be used anywhere in the combined cycle plant 10 where heat is necessary, such as to protect any component from freezing. Freeze protection could be accomplished by routing the heated air through small, flexible metal tracing lines etc. Alternately, the heated clean air 98 could be used to cool a component of the gas turbine engine 12, depending on the relative temperatures of the heated clean air 98 and the component In an exemplary embodiment, the heated clean air 98 can be fed directly into the engine turbine 16, or it can be fed into the kettle boiler 26, 28 and then directed to the engine turbine 16. Upon leaving the engine turbine 16 or any heated/preheated component, spent heated clean air 98, or any spent air that still contains heat could be returned to the supplemental air heater 44 which may increase efficiency.

In another exemplary embodiment HRSG feedwater 100 could be preheated in a second air heater exhaust heat exchanger 102 using heat transferred either directly from the supplemental heater exhaust 90 or indirectly, by using heat from the supplemental heater exhaust 90 to create the heated clean air 98 that in turn heats the HRSG feedwater 100 The clean air 96 may be supplied from any source or combination of sources. In an exemplary embodiment the clean air 96 includes or is exclusively the supplemental air 48 generated by the supplemental air provider 46.

In an exemplary embodiment where the gas turbine engine 12 and the supplemental air arrangement 40 are operating simultaneously, the supplemental air arrangement 40 could supply the supplemental heated air 42 necessary to operate the kettle boilers In this case it would no longer be necessary to use as much or any of the engine heated and compressed air 50 from the gas turbine engine 12. By not bleeding off the engine heated and compressed air 50 the gas turbine engine 12 could operate more efficiently and this may contribute to an overall increase in efficiency of the combined cycle plant 10

In an alternate exemplary embodiment, where the gas turbine engine 12 and the supplemental air arrangement 40 are operating simultaneously, the engine heated and compressed air 50 could continue to be used in the kettle boilers while the supplemental heated air 42 could be directed to a lower temperature section of the HRSG 20 to provide a temperature boost in that section This could potentially boost steam production in the HRSG 20 in much the same way a duct burner would, and hence increase an overall operating efficiency of the combined cycle plant 10.

From the foregoing is can be seen that the present inventors have devised a new and unique arrangement that can generate auxiliary steam for a gas turbine plant, thereby eliminating the need for the conventional auxiliary steam generation plant. This represents a cost savings in terms of capital investment and maintenance In addition, resources made available by the arrangement can be utilized in a variety of ways that can result in an increase in operating efficiency A better utilization of heat energy present in the proposed system further contributes to the increase in operating efficiency of the combined cycle plant.

While various embodiments of the present invention have been shown and described herein, it will be obvious that such embodiments are provided by way of example only. Numerous variations, changes and substitutions may be made without departing from the invention herein Accordingly, it is intended that the invention be limited only by the spirit and scope of the appended claims.

The invention claimed is:

1. A combined cycle plant comprising:
    a gas turbine engine;
    a heat recovery steam generator (HRSG) configured to receive exhaust from the gas turbine engine;
    a steam turbine configured to receive steam from the HRSG;
    a supplemental air arrangement configured to generate supplemental heated air when operating and to operate independent of the gas turbine engine; and
    a kettle boiler configured to use heat from the supplemental heated air to generate steam used in the steam turbine.

2. The combined cycle plant of claim 1, wherein the supplemental air arrangement comprises an interstage cooled air compressor configured to compress air, and wherein the kettle boiler is configured to receive feedwater that is preheated by cooling the interstage cooled air compressor.

3. The combined cycle plant of claim 1, wherein the supplemental air arrangement comprises an air compressor configured to generate compressed air, and wherein the combined cycle plant comprises instrumentation configured to receive the compressed air generated by the air compressor.

4. The combined cycle plant of claim 1, wherein the supplemental air arrangement comprises an air compressor configured to generate compressed air, and wherein the gas turbine engine comprises a blade tip clearance control arrangement configured to receive compressed air generated by the air compressor.

5. The combined cycle plant of claim 1, wherein the supplemental air arrangement comprises an air heater that generates air heater exhaust, and wherein the HRSG is configured to receive the air heater exhaust.

6. The combined cycle plant of claim 1, wherein the supplemental air arrangement comprises an air heater that generates air heater exhaust; and an air heater exhaust heat exchanger configured to receive the air heater exhaust, wherein a component of the combined cycle plant is configured receive heat from clean air that is heated in the air heater exhaust heat exchanger.

7. The combined cycle plant of claim 6, wherein the supplemental air arrangement comprises an air blower or an air compressor, and wherein the clean air that is heated in the air heater exhaust heat exchanger comprises air generated by the air blower or the air compressor.

8. The combined cycle plant of claim 1, wherein the supplemental air arrangement comprises an air heater that generates air heater exhaust, and wherein the combined cycle plant comprises a HRSG feedwater heat exchanger configured to heat HRSG feedwater by transferring heat from the air heater exhaust to the HRSG feedwater.

9. The combined cycle plant of claim 1, wherein the kettle boiler and the supplemental air arrangement generate auxiliary steam used in the combined cycle plant when the gas turbine engine is not operating.

10. The combined cycle plant of claim 1, wherein the supplemental heated air from the supplemental air arrangement enters and then exits the kettle boiler, and wherein at least one of the steam turbine, a catalyst in the HRSG, and the HRSG is configured to receive the air exiting the kettle boiler.

11. A combined cycle plant comprising:
    a gas turbine engine comprising a compressor;
    a heat recovery steam generator (HRSG) configured to receive exhaust from the gas turbine engine;
    a steam turbine configured to receive steam from the HRSG;
    a supplemental air arrangement configured to generate supplemental heated air when operating and to operate whether or not the gas turbine engine is operating; and
    a kettle boiler configured to generate steam using at least one of the supplemental heated air from the supplemental air arrangement and heated air from the compressor, wherein when the gas turbine engine is not operating the supplemental air arrangement and the kettle boiler are configured to provide auxiliary steam.

12. The combined cycle plant of claim 11, wherein the supplemental air arrangement comprises a supplemental air compressor configured to generate compressed air, wherein the combined cycle plant comprises at least one of a blade tip clearance control arrangement configured to receive the compressed air; and instrumentation configured to receive the compressed air.

13. The combined cycle plant of claim 11, wherein the supplemental air arrangement comprises an air heater that generates air heater exhaust; and wherein a component of the combined cycle plant is configured to receive heat from the air heater exhaust.

14. The combined cycle plant of claim 11, wherein the supplemental air arrangement comprises an air heater that generates air heater exhaust, and wherein the HRSG is configured to receive the air heater exhaust.

15. The combined cycle plant of claim 11, wherein the supplemental heated air from the supplemental air arrangement enters and then exits the kettle boiler, and wherein at least one of the steam turbine, a catalyst in the HRSG, and the HRSG is configured to receive the air exiting the kettle boiler.

16. In a combined cycle plant comprising a kettle boiler operatively connected to receive heated compressed air from a compressor of a gas turbine engine of the combined cycle plant for producing steam for use in the combined cycle plant, an improvement comprising a supplemental air arrangement configured to operate as a supplemental source of heated air operatively connected to the kettle boiler for producing the steam during periods when the compressor is not producing heated compressed air.

17. The combined cycle plant of claim 16, wherein the supplemental air arrangement comprises a supplemental air compressor configured to generate compressed air, wherein the combined cycle plant comprises at least one of a blade tip clearance control arrangement configured to receive the compressed air; and instrumentation configured to receive the compressed air.

18. The combined cycle plant of claim 16, wherein the supplemental air arrangement comprises an air heater that generates air heater exhaust; and wherein a component of the combined cycle plant is configured receive heat from the air heater exhaust.

19. The combined cycle plant of claim 18, wherein the supplemental air arrangement comprises: a supplemental air compressor or a blower configured to generate supplemental air; and an air heater exhaust heat exchanger configured to transfer heat from the air heater exhaust to the supplemental air, and wherein the component of the combined cycle plant is configured receive heat from the heated supplemental air.

20. The combined cycle plant of claim 16, wherein the combined cycle plant comprises a steam turbine, a selective catalytic reduction (SCR) catalyst, or a HRSG, and wherein the supplemental heated air from the supplemental air arrangement enters and then exits the kettle boiler, and wherein at least one of the steam turbine, the SCR catalyst, and the HRSG is configured to receive the air exiting the kettle boiler.

* * * * *